US012704070B2

(12) United States Patent
Kim et al.

(10) Patent No.: US 12,704,070 B2
(45) Date of Patent: Aug. 11, 2026

(54) AIRFOIL, TURBINE BLADE INCLUDING THE AIRFOIL, AND GAS TURBINE INCLUDING THE TURBINE BLADE

(71) Applicants: DOOSAN ENERBILITY CO., LTD., Changwon (KR); INDUSTRY-ACADEMIC COOPERATION FOUNDATION YONSEI UNIVERSITY, Seoul (KR)

(72) Inventors: Seok Beom Kim, Seoul (KR); Hyung Hee Cho, Seoul (KR); Gyeong Ryun Kim, Seoul (KR); Yu Min Kim, Seoul (KR); Hee Jae Lee, Seoul (KR)

(73) Assignees: DOOSAN ENERBILITY CO., LTD., Changwon (KR); INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 0 days.

(21) Appl. No.: 19/340,934

(22) Filed: Sep. 26, 2025

(65) Prior Publication Data

US 2026/0117660 A1 Apr. 30, 2026

(30) Foreign Application Priority Data

Oct. 28, 2024 (KR) ........................ 10-2024-0148752

(51) Int. Cl.
*F01D 5/18* (2006.01)

(52) U.S. Cl.
CPC ............ *F01D 5/187* (2013.01); *F01D 5/186* (2013.01); *F05D 2260/201* (2013.01); *F05D 2260/202* (2013.01); *F05D 2260/22141* (2013.01)

(58) Field of Classification Search
CPC .......... F01D 5/185; F01D 5/186; F01D 5/187; F01D 5/188; F01D 5/189; F05D 2260/202; F05D 2250/185
See application file for complete search history.

(56) References Cited

U.S. PATENT DOCUMENTS

| | | | |
|---|---|---|---|
| 5,356,265 | A | 10/1994 | Kercher |
| 5,702,232 | A | 12/1997 | Moore |

(Continued)

FOREIGN PATENT DOCUMENTS

| | | | |
|---|---|---|---|
| CA | 2467188 | A1 | 5/2003 |
| EP | 1091092 | B1 | 12/2008 |

(Continued)

*Primary Examiner* — Nathaniel E Wiehe
*Assistant Examiner* — Maxime M Adjagbe
(74) *Attorney, Agent, or Firm* — Harvest IP Law, LLP

(57) ABSTRACT

Proposed are an airfoil, a turbine blade including the airfoil, and a gas turbine including the turbine blade. The airfoil includes a suction side having an outwardly convex surface, a pressure side having a concave surface toward the suction side, a leading edge connecting the suction side and the pressure side and defining a front end of the airfoil, a trailing edge connecting the suction side and the pressure side and defining a rear end of the airfoil, a cooling flow passage configured to guide cooling fluid introduced from a lower portion of the suction side and the pressure side, to one or more flow channels respectively at the suction side and the pressure side, and then discharge the cooling fluid to a region rearward of the trailing edge, and a flow guide part provided in each of the one or more flow channels and forming a cooling space.

17 Claims, 9 Drawing Sheets

(56) References Cited

U.S. PATENT DOCUMENTS

| | | | | | |
|---|---|---|---|---|---|
| 5,720,431 | A * | 2/1998 | Sellers | F01D 5/186 416/96 A |
| 6,705,836 | B2 * | 3/2004 | Bourriaud | F01D 5/187 415/115 |
| 7,413,403 | B2 | 8/2008 | Cunha | |
| 8,292,581 | B2 * | 10/2012 | Poon | F01D 5/081 416/97 R |
| 2017/0107828 | A1 | 4/2017 | Krumanaker | |
| 2020/0191000 | A1 | 6/2020 | Pang | |
| 2023/0243267 | A1 * | 8/2023 | Preuss | F01D 5/189 415/115 |

FOREIGN PATENT DOCUMENTS

| | | | |
|---|---|---|---|
| EP | 1803897 | B1 | 1/2012 |
| JP | 2002-508045 | A | 3/2002 |
| KR | 10-2024-0068394 | A | 5/2024 |
| WO | 2016133487 | A1 | 8/2016 |

* cited by examiner

AIRFOIL, TURBINE BLADE INCLUDING THE AIRFOIL, AND GAS TURBINE INCLUDING THE TURBINE BLADE

CROSS REFERENCE TO RELATED APPLICATION

The present application claims priority to Korean Patent Application No. 10-2024-0148752, filed on Oct. 28, 2024, the entire contents of which are incorporated herein by this reference for all purposes.

BACKGROUND

Technical Field

The present disclosure relates to an airfoil, a turbine blade including the airfoil, and a gas turbine including the turbine blade and, more particularly, to an airfoil capable of enhancing cooling effects on a suction side and a pressure side, a turbine blade including the same, and a gas turbine.

Description of the Related Art

A turbine is a mechanical device that obtains rotational power through impulse or reaction force by utilizing the flow of a compressible fluid such as steam or gas. For example, there is a steam turbine using steam and a gas turbine using high-temperature combustion gas.

Among them, a gas turbine is generally composed of a compressor, a combustor, and a turbine. The compressor has an air inlet for introducing air, and a plurality of compressor vanes and compressor blades are alternately arranged in a compressor casing. Air introduced from the outside is gradually compressed while passing through rotating compressor blades arranged in multiple stages, and its pressure increases to a target level.

The combustor produces high-temperature and high-pressure combustion gas by supplying fuel to compressed air produced through the compressor and igniting the air-fuel mixture with a burner.

The turbine includes a plurality of turbine vanes and turbine blades are alternately arranged in a turbine casing. Further, a rotor is disposed through the centers of the compressor, the combustor, the turbine, and the exhaust chamber.

Both ends of the rotor are rotatably supported by bearings. Further, a plurality of disks is fixed to the rotor, blades are connected to each of the disks, and the driving shaft of a generator etc. is connected to the end at the exhaust chamber.

Such a gas turbine does not have a reciprocating mechanism like the piston of a four-stroke engine, and thus there is no mutual friction component such as a piston-cylinder, which results in extremely low consumption of lubricating oil, a significant reduction in vibration of reciprocating machines, and an advantage of enabling high-speed operation.

There are various factors that affect the efficiency of gas turbines. In recent gas turbine development, research has been conducted in various areas, including improving combustion efficiency in the combustor, enhancing thermodynamic efficiency by increasing turbine inlet temperature, and improving aerodynamic efficiency in the compressor and turbine.

The class of industrial gas turbines for power generation can be classified on the basis of the turbine inlet temperature (TIT), and currently, G-class and H-class gas turbines are taking the lead, with some of the latest gas turbines having reached the J-class. As the class of a gas turbine increases, both the efficiency and the turbine inlet temperature rise. Since the turbine inlet temperature of an H-class gas turbine reaches 1,500° C., the development of heat-resistant materials and advancement of cooling technology are required.

With turbine inlet temperatures continuing to rise, various cooling structures are being applied to ensure the heat resistance performance of turbine blades. For example, a cooling structure that forms a single cooling flow passage inside a turbine blade has been proposed. However, this structure suffers from the drawback of limited heat transfer efficiency with the pressure side and suction side, and thus requires supplying a large amount of cooling fluid to the cooling flow passage. A prior art document includes Korean Patent No. 10-1580490, registered on Dec. 21, 2015.

SUMMARY

The present disclosure has been devised to meet the circumstances described above, and an objective of the present disclosure is to provide: an airfoil in which a flow guide part is formed in one or more flow channels that are formed inside a blade and through which cooling fluid for cooling the blade flows, and in which the cooling fluid is sprayed onto a suction side or a pressure side by using the flow guide part to perform impingement cooling, thereby cooling the suction side or the pressure side and improving cooling performance; a turbine blade including the airfoil; and a gas turbine including the turbine blade.

In order to achieve the objectives, the present disclosure provides an airfoil that includes: a suction side having an outwardly convex surface; a pressure side having a concave surface toward the suction side; a leading edge connecting the suction side and the pressure side and defining a front end of the airfoil; a trailing edge connecting the suction side and the pressure side and defining a rear end of the airfoil; a cooling flow passage configured to guide cooling fluid, which is introduced from a lower portion of the suction side and the pressure side, to one or more flow channels respectively at the suction side and the pressure side and then discharge the cooling fluid to a region rearward of the trailing edge; a flow guide part provided in each of the one or more flow channels and forming a cooling space; and a plurality of cooling fluid spray holes formed in the flow guide part and configured to spray the cooling fluid, which is supplied into the one or more flow channels, to the suction side and the pressure side, each forming an inner surface of the cooling space.

In the airfoil according to the present disclosure, a plurality of flow guides protruding toward the cooling space may be provided on one surface of the flow guide part, a plurality of impingement holes, each in communication with a corresponding one of the plurality of cooling fluid spray holes, may be formed respectively in the plurality of flow guides, a circumferential surface of each of the plurality of flow guides may have a circular shape, and each of the plurality of cooling fluid spray holes may be disposed at a center of a corresponding flow guide of the plurality of flow guides, and each of the plurality of flow guides may protrude obliquely from its circumferential surface toward a center where a corresponding impingement hole is formed.

The airfoil according to the present disclosure may further include a plurality of heat transfer fins provided on the one surface of the flow guide part and connecting the flow guide part to the suction side or to the pressure side.

The plurality of heat transfer fins may be arranged on the one surface of the flow guide part so as to be positioned at top, bottom, left, and right locations around each cooling fluid spray hole, outer circumferential surfaces of the plurality of heat transfer fins may be disposed on the circumferential surface of each of the plurality of flow guides, and a distance between an outlet of the cooling fluid spray hole and the suction side or the pressure side may be greater than 0.5 times and less than 1.5 times a diameter of a corresponding one of the plurality of cooling fluid spray holes.

The cooling flow passage may include: a first cooling flow passage configured to guide the cooling fluid introduced from the lower portion of the pressure side at the the leading edge, along the pressure side, and then discharge the cooling fluid toward the region rearward of the trailing edge; and a second cooling flow passage configured to divide the cooling fluid introduced from the lower portion of the suction side to the one or more flow channels formed at the suction side, merge the divided cooling fluid, and then discharge the cooling fluid toward the region rearward of the trailing edge.

The first cooling flow passage may include: a first inlet extending downward from the lower portion of the pressure side at the leading edge and configured to receive the cooling fluid; a 1-1 flow channel configured to guide the cooling fluid introduced into the first inlet toward an airfoil tip; a 1-2 flow channel formed adjacent to the 1-1 flow channel and configured to guide the cooling fluid toward a root portion of the airfoil; a 1-3 flow channel formed adjacent to the 1-2 flow channel and configured to guide the cooling fluid toward the airfoil tip; a 1-1 turning channel extending toward the trailing edge from an upper end of the 1-1 flow channel; and a 1-2 turning channel extending toward the trailing edge from a lower end of the 1-2 flow channel; a 1-3 turning channel extending toward the trailing edge from an upper end of the 1-3 flow channel; and a first discharge channel configured to discharge the cooling fluid flowing through the 1-3 flow channel to an outside of the airfil, and the second cooling flow passage may include: a 2-1 inlet and a 2-2 inlet extending downward from the lower portion of the suction side and configured to receive the cooling fluid; a 2-1 flow channel and a 2-3 flow channel configured to respectively guide the cooling fluid introduced into the 2-1 inlet and the 2-2 inlet toward the airfoil tip; a 2-2 flow channel and a 2-4 flow channel formed adjacent to the 2-1 flow channel and the 2-3 flow channel, respectively, and configured to guide the cooling fluid toward the root portion of the airfoil; a 2-1 turning channel extending toward the trailing edge from an upper end of the 2-1 flow channel; and a 2-2 turning channel extending toward the leading edge from an upper end of the 2-3 flow channel.

A communication hole that is in communication with a central cavity may be formed at a lower end of each of the 2-2 flow channel and the 2-4 flow channel, the central cavity being formed in an area defined by a cavity at the leading edge, cavities at the pressure side, and cavities at the suction side, the cooling fluid flowing through the 2-2 flow channel and the 2-4 flow channel may merge within the central cavity through the communication holes, the second cooling flow passage may further include a second discharge channel configured to discharge the cooling fluid in the central cavity to the outside of the airfoil, and a connecting hole that is in communication with the second discharge channel may be formed on a side at the trailing edge of the central cavity.

Further, the present disclosure provides a turbine blade mounted on a turbine rotor disk and rotated by high-pressure combustion gas, the turbine blade comprising: a root portion coupled to the turbine rotor disk; and an airfoil coupled to the root portion, and having a cooling flow passage comprising a first cooling flow passage and a second cooling flow passage formed in the airfoil, wherein the airfoil comprises: a suction side having an outwardly convex surface; a pressure side having a concave surface toward the suction side; a leading edge connecting the suction side and the pressure side and defining a front end of the airfoil; a trailing edge connecting the suction side and the pressure side and defining a rear end of the airfoil; the cooling flow passage configured to guide cooling fluid introduced from a lower portion of the suction side and the pressure side, to one or more flow channels respectively at the suction side and the pressure side, and then discharge the cooling fluid to a region rearward of the trailing edge; a flow guide part provided in each of the one or more flow channels and forming a cooling space; and a plurality of cooling fluid spray holes formed in the flow guide part and configured to spray the cooling fluid supplied into the one or more flow channels to the suction side and the pressure side, each forming an inner surface of the cooling space.

Further, the present disclosure provides a gas turbine comprising: a compressor configured to compress intake air; a combustor configured to mix compressed air from the compressor with fuel and burn the mixture; and a turbine configured to generate power using combustion gas from the combustor, and comprising turbine vanes configured to guide the combustion gas on a combustion gas path along which the combustion gas flows and turbine blades that are rotated by the combustion gas on the combustion gas path, wherein the turbine blade comprises an airfoil having a cooling flow passage comprising a first cooling flow passage and a second cooling flow passage formed in the airfoil, wherein the airfoil comprises: a suction side having an outwardly convex surface; a pressure side having a concave surface toward the suction side; a leading edge connecting the suction side and the pressure side and defining a front end of the airfoil; a trailing edge connecting the suction side and the pressure side and defining a rear end of the airfoil; the cooling flow passage configured to guide cooling fluid introduced from a lower portion of the suction side and the pressure side, to one or more flow channels respectively at the suction side and the pressure side, and to discharge the cooling fluid to a region rearward of the trailing edge; a flow guide part provided in each of the one or more flow channels and forming a cooling space; and a plurality of cooling fluid spray holes formed in the flow guide part and configured to spray the cooling fluid supplied into the one or more flow channels to the suction side and the pressure side, each forming an inner surface of the cooling space.

According to the airfoil, the turbine blade including the airfoil, and the gas turbine including the turbine blade according to the present disclosure, cooling fluid can be sprayed onto the suction side and the pressure side to perform impingement cooling, thereby improving the cooling performance for the airfoil, and reducing the amount of cooling fluid required. Improved cooling performance of the airfoil also enhances the engine performance of the gas turbine.

DETAILED DESCRIPTION

Hereinafter, exemplary embodiments of the present disclosure will be described in detail with reference to accompanying drawings. The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Figure 1:
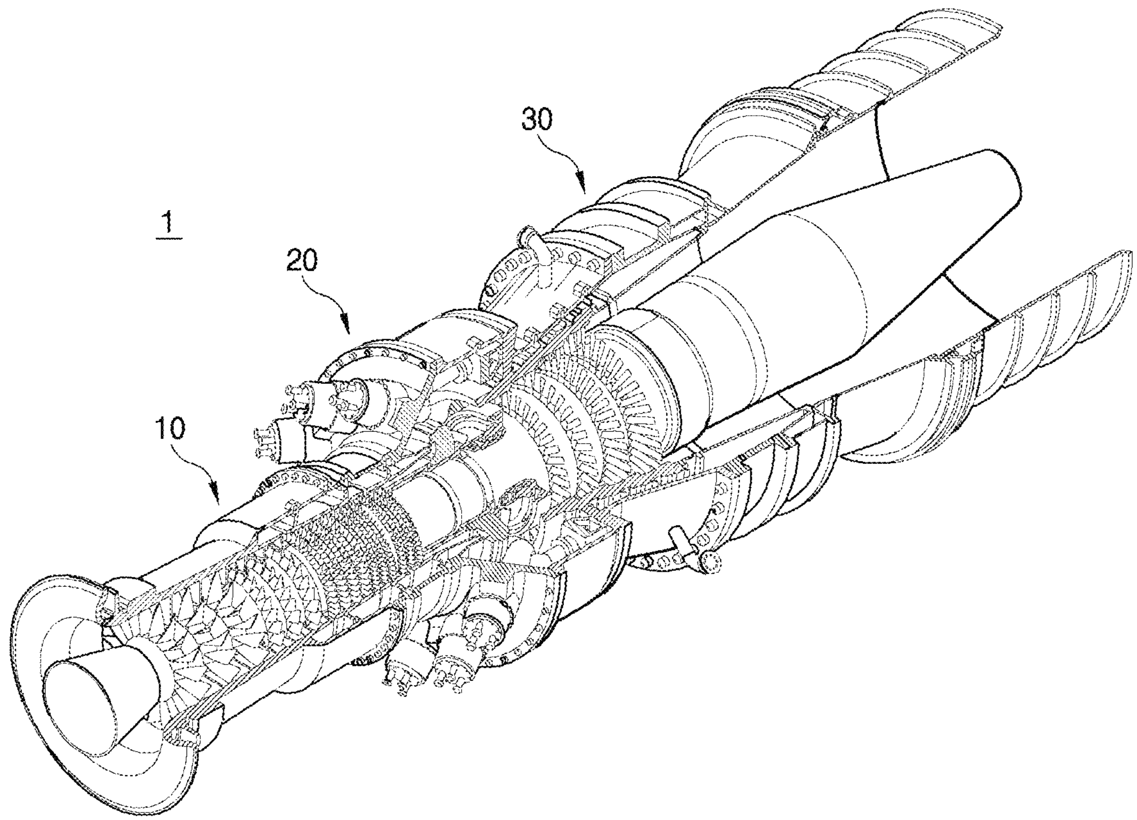
FIG. 1 is a diagram showing the inside of a gas turbine according to an embodiment of the present disclosure.
Figure 2:
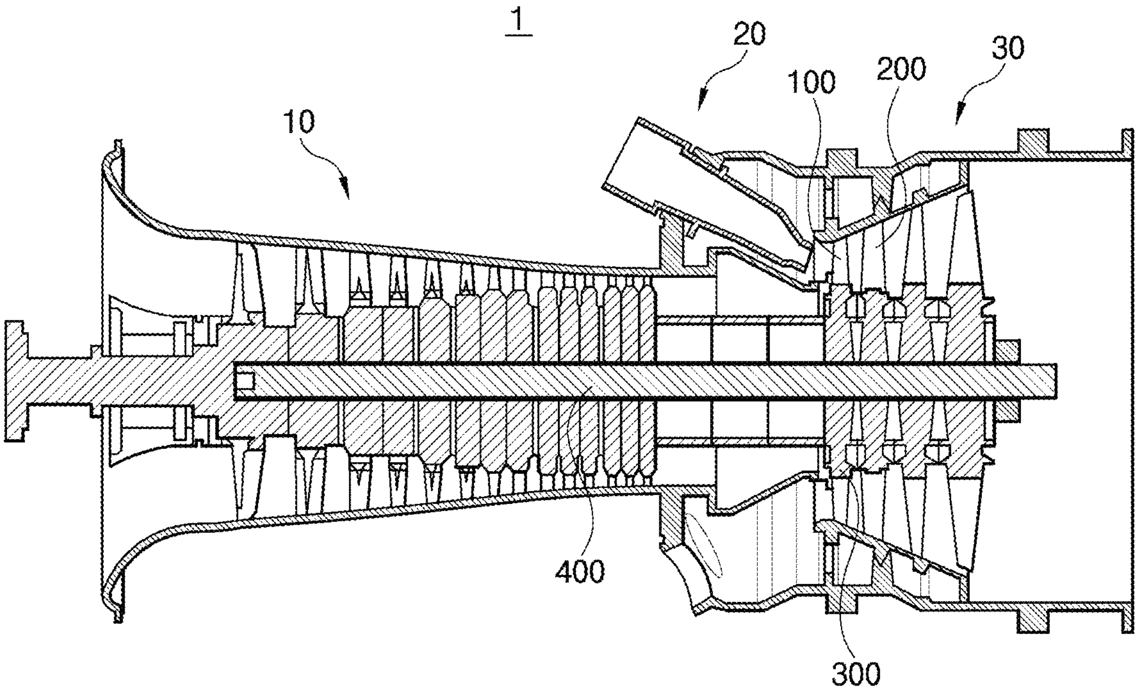
FIG. 2 is a cross-sectional view showing a cut-away portion of the gas turbine shown in FIG. 1.

Referring to FIGS. 1 and 2, a gas turbine 1 according to an embodiment of the present disclosure includes a compressor 10, a combustor 20, and a turbine 30. The compressor 10 serves to compress incoming air to a high pressure and delivers the compressed air to the combustor 20. The compressor 10 includes a plurality of compressor blades arranged radially, receives a portion of the power generated by rotation of the turbine 30, thereby rotating the compressor blades, and moves air to the combustor while being compressed by the rotation of the compressor blades. The size and installation angle of the compressor blades may vary depending on their installation positions.

The compressed air from the compressor 10 moves to the combustor 20, and is mixed and burned with fuel through a plurality of combustion chambers and fuel nozzle modules arranged annularly. The high-temperature combustion gas generated by the combustion is discharged to the turbine 30, and the turbine is rotated by the combustion gas.

The turbine 30 is arranged in multiple stages through a center tie rod 400 that axially couples turbine rotor disks 300. The turbine rotor disk 300 includes a plurality of turbine blades 200 arranged radially. The turbine blades 200 may be coupled to the turbine rotor disk 300 using a dovetail structure or the like. Turbine vanes 100, fixed to the housing, are provided between the turbine blades 200 and guide the flow direction of the combustion gas that has passed through the turbine blades 200.

The turbine 30 may have a first predefined number of turbine vanes 100 and a second predefined number of turbine blades 200 alternately arranged in a predefined number of stages along the axial direction of the gas turbine 1, and high-temperature combustion gas passes through the turbine vanes 100 and the turbine blades 200 along the axial direction and rotates the turbine blades 200.

Figure 3:
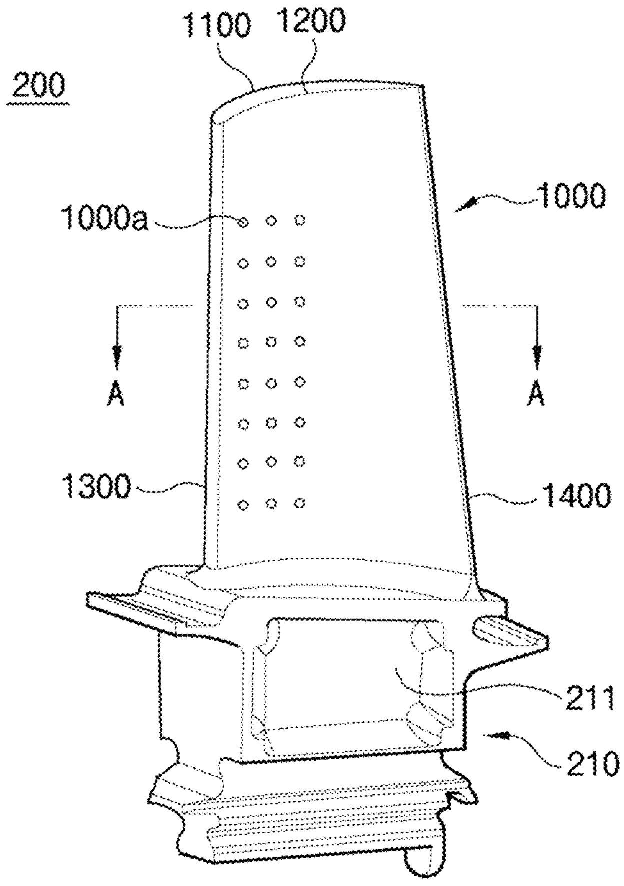
FIG. 3 is a perspective view showing a turbine blade including an airfoil according to an example of the present disclosure.
Figure 4:
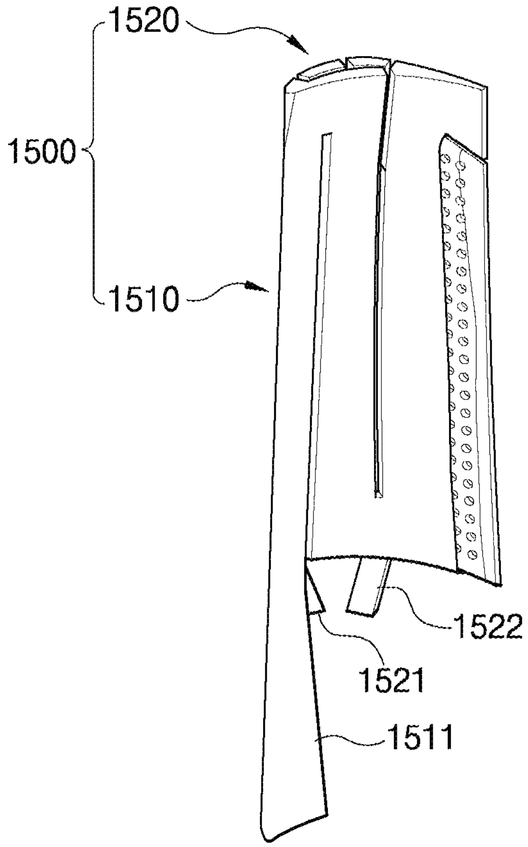
FIG. 4 is a perspective view showing the inside of an airfoil from a pressure side according to an embodiment of the present disclosure.
Figure 5:
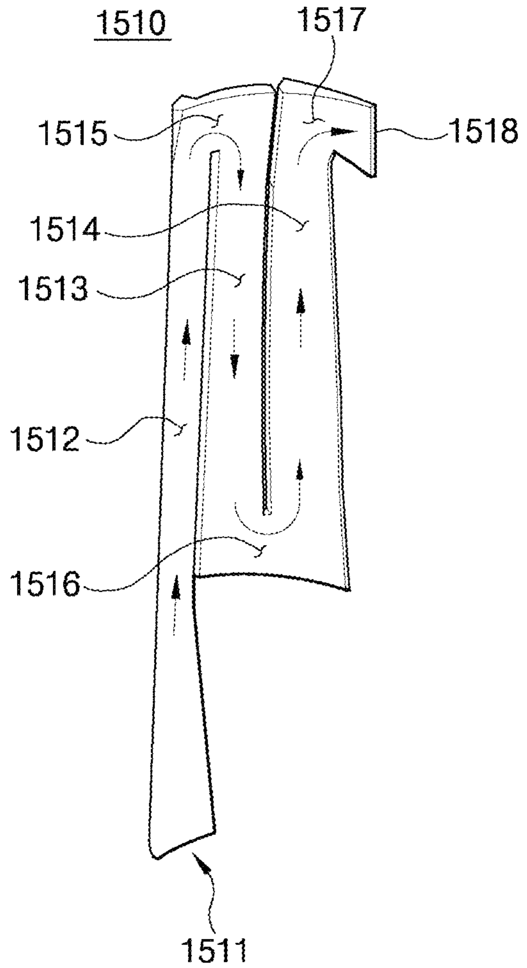
FIG. 5 is a perspective view showing a first cooling flow passage formed inside the airfoil according to an embodiment of the present disclosure.
Figure 6:
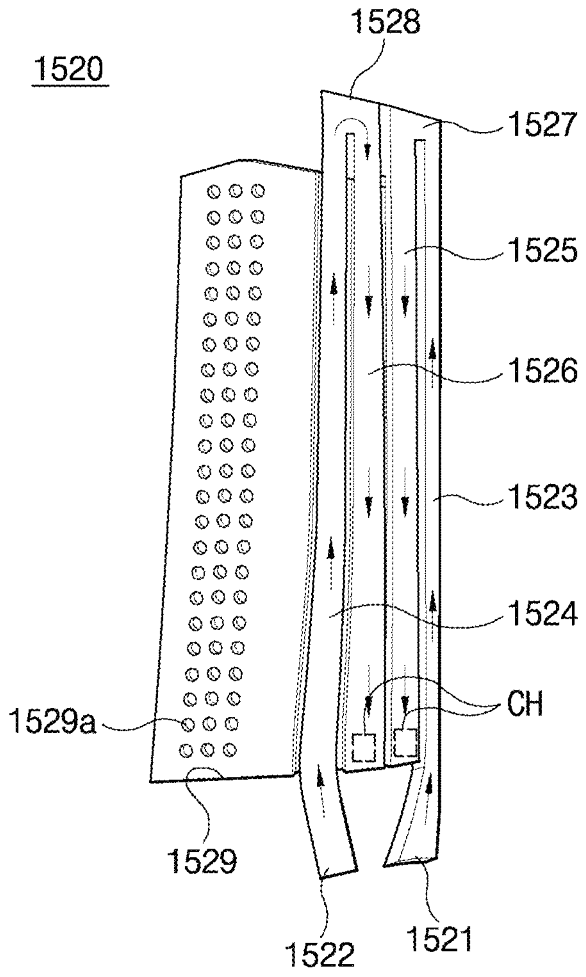
FIG. 6 is a perspective view showing a second cooling flow passage formed inside the airfoil according to an embodiment of the present disclosure.

Referring to FIGS. 2 and 3, the turbine blade 200 includes a root portion 210 and an airfoil 1000, the root portion 210 is coupled to the turbine rotor disk 300, the airfoil 1000 is coupled to the root portion 210 and rotated by the high-pressure combustion gas from the combustor, and a cooling flow passage 1500 including a first cooling flow passage 1510 and a second cooling flow passage 1520 is formed inside the airfoil.

The turbine blade 200 is mounted on the turbine rotor disk 300, and the turbine is rotated by high-pressure combustion gas. The root portion 210, which is coupled to the turbine rotor disk 300, is formed at the lower portion of the airfoil, and the airfoil 1000, which is rotated by the high-pressure combustion gas from the combustor, is integrally coupled to the upper portion of the root portion 210, so the turbine 30 is rotated by the pressure difference between the front and rear surfaces of the airfoil 1000.

On the outer surface of the root portion 210, a shank and a platform protruding outward may be formed to ensure firm fixation. An inlet 211 through which cooling fluid flows into the airfoil 1000 is formed at the root portion 210. The cooling fluid, which is part of the compressed air compressed by the compressor 10 or air supplied by compressing external air, is supplied from the compressor 10 to the root portion 210 of the turbine blade 200, and flows into the airfoil 1000 through the inlet 211, thereby cooling the turbine blade 200. Alternatively, the cooling fluid is supplied to the root portion 210 through an internal flow passage (not shown) connected to the turbine 30 from the compressor 10 and flows into the airfoil 1000 through the inlet 211, thereby cooling the turbine blade 200.

The airfoil 1000 has a suction side 1100 with an outwardly convex surface on the front surface where combustion gas enters, and a pressure side 1200 with a concave surface facing the suction side. This configuration maximizes the pressure difference between the front and rear of the airfoil 1000 and allows the combustion gas to flow smoothly.

The airfoil 1000 includes a leading edge 1300 and a trailing edge 1400, which are ends where the suction side 1100 and the pressure side 1200 meet. The leading edge 1300 is the front end that first encounters the fluid flowing over the airfoil 1000, while the trailing edge 1400 is the rear end from which the fluid leaves the airfoil.

The airfoil 1000 may include a plurality of cooling holes **1000*a* formed through the suction side 1100 or the pressure side 1200. Cooling fluid is sprayed through the cooling holes 1000*a* and acts like an air curtain on the outer surface of the airfoil 1000, thereby being able to cool the outer surface of the airfoil 1000 by film cooling. The cooling holes 1000*a* may not be formed at the leading edge 1300**.

Referring to FIGS. 4 to 7, a cooling flow passage 1500 configured to guide the cooling fluid, which is introduced from the lower portion of the suction side 1100 and the pressure side 1200, to one or more flow channels respectively at the suction side 1100 and the pressure side 1200, and then to discharge the cooling fluid toward a region rearward of the trailing edge 1400 is formed inside the airfoil 1000. The cooling flow passage 1500 may include a first cooling flow passage 1510 and a second cooling flow passage 1520. The cooling fluid may cool the airfoil 1000 by impinging on the inner walls of the first cooling flow passage 1510 and a second cooling flow passage 1520 while flowing through the first cooling flow passage 1510 and the second cooling flow passage 1520.

The first cooling flow passage 1510 guides the cooling fluid introduced from the lower portion of the pressure side at the leading edge 1300 to the one or more flow channels formed at the pressure side 1200 and then discharges the cooling fluid toward the region rearward of the trailing edge 1400. The second cooling flow passage 1520 divides the cooling fluid introduced from the lower portion of the suction side 1100 into the one or more flow channels formed at the suction side 1100, merges the divided cooling fluid, and then discharges it toward the region rearward of the trailing edge 1400.

Figure 7:
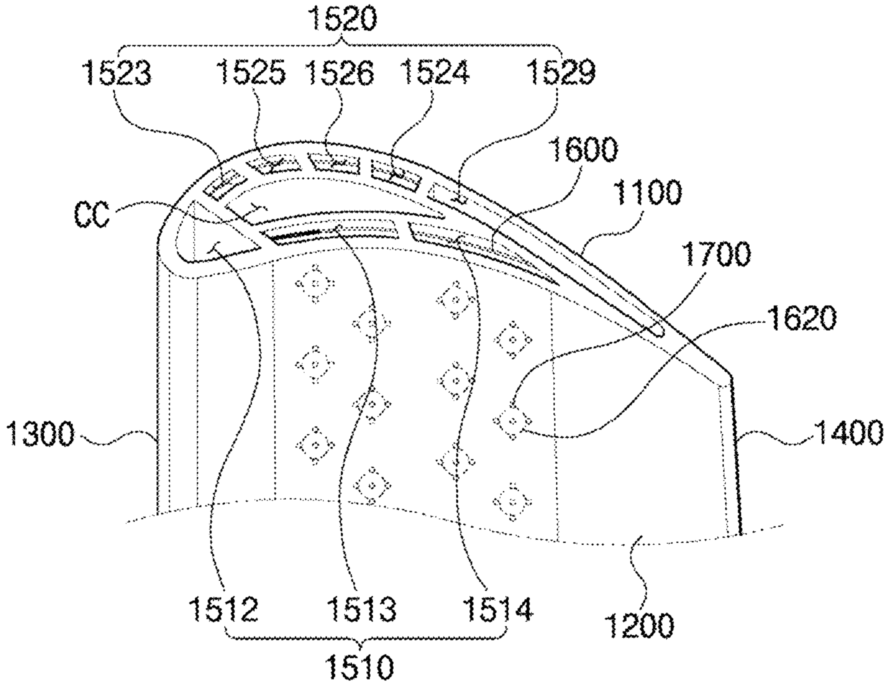
FIG. 7 is a cross-sectional view taken along line A-A of FIG. 3.
Figure 8:
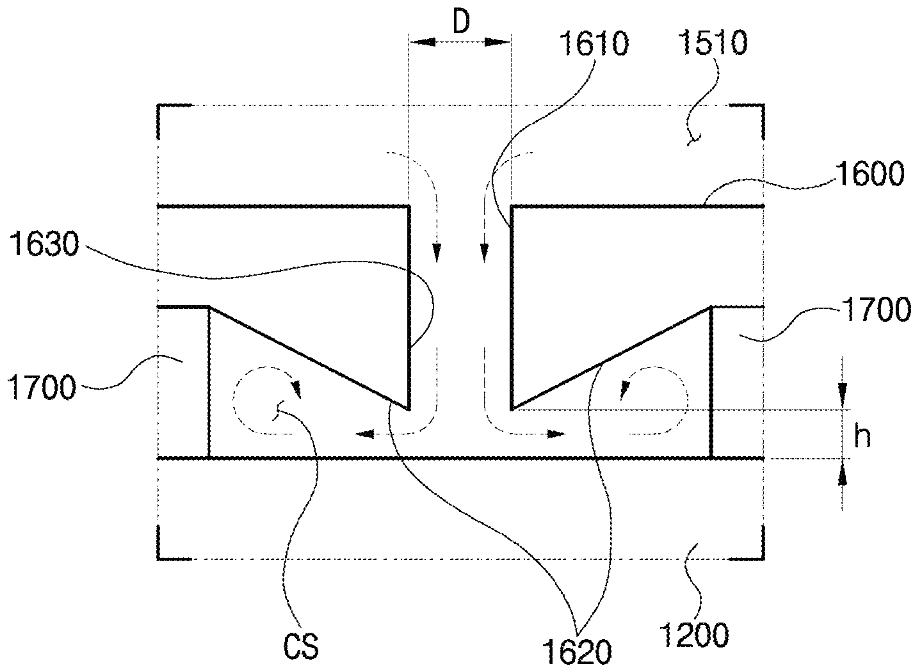
FIG. 8 is an enlarged view showing a state in which a flow guide part and a plurality of heat transfer fins are installed in the flow channel shown in FIG. 7.
Figure 9:
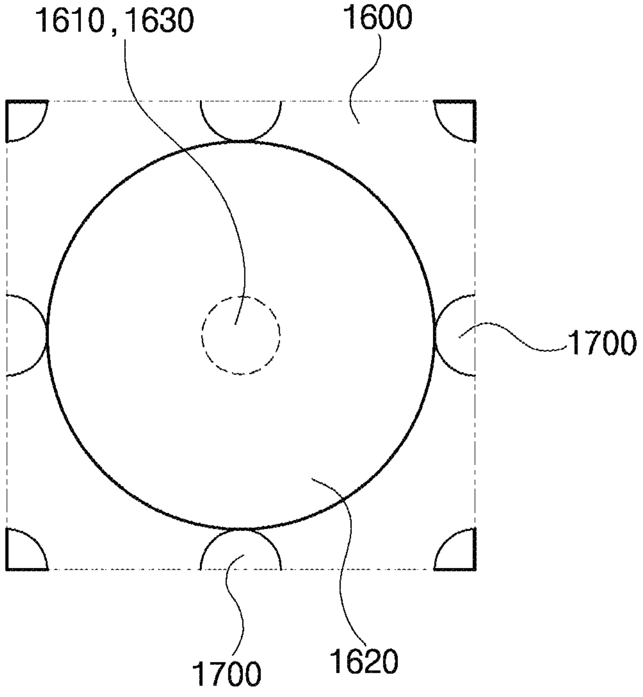
FIG. 9 is a side view showing the flow guide part with the plurality of heat transfer fins installed, as seen from the side, shown in FIG. 8.

Referring to FIGS. 7 to 9, each flow channel of the one or more flow channels included in the first cooling flow passage 1510 and the second cooling flow passage 1520 is provided with a flow guide part 1600 that forms a cooling space CS, and the cooling fluid introduced into the first cooling flow passage 1510 and the second cooling flow passage 1520 is directed to each of the one or more flow channels.

The flow guide part 1600 has a plurality of cooling fluid spray holes 1610 for spraying the cooling fluid, which is supplied into the one or more flow channels, toward the suction side 1100 and the pressure side 1200, each of which forms the inner surface of the cooling space CS.

A plurality of flow guides 1620 may be provided on one surface of the flow guide part 1600 provided in each of the one or more flow channels, the plurality of flow guides 1620 may protrude toward the cooling space CS from the surface of the flow guide part 1600, and a plurality of impingement holes 1630, each in communication with a corresponding one of the plurality of cooling fluid spray holes 1610, may be formed respectively in the plurality of flow guides 1620.

The cooling fluid moving through the first cooling flow passage 1510 or the second cooling flow passage 1520 can be sprayed onto the suction side 1100 or the pressure side 1200 through the cooling fluid spray holes 1610 and the impingement holes 1630, so that it can collide with the suction side 1100 or the pressure side 1200, whereby it is possible enhance the cooling performance of the airfoil and accordingly it is possible to reduce the amount of cooling fluid that is used.

The circumferential surface of each of the plurality of flow guides 1620 may have a circular shape, each of the plurality of cooling fluid spray holes 1610 and each of the plurality of impingement holes 1630 may be disposed at the center of a corresponding flow guide of the plurality of flow guides 1620, and each flow guide 1620 may be formed in a conical shape that protrudes obliquely from its circumferential surface toward the center where a corresponding impingement hole 1630 is formed.

A plurality of heat transfer fins 1700 are provided on the one surface of the flow guide part 1600 and connects the flow guide part 1600 to the suction side 1100 or to the pressure side 1200, thereby transferring heat from the suction side 1100 or the pressure side 1200 to the flow guide part 1600.

The plurality of heat transfer fins 1700 may be arranged on the one surface of the flow guide part 1600 so as to be positioned at top, bottom, left, and right locations around each cooling fluid spray hole 1610 formed in the flow guide part 1600, and the outer circumferential surfaces of the plurality of heat transfer fins 1700 may be disposed on the circumferential surface of each of the plurality of the flow guides 1620.

The distance h between each impingement hole 1630, which is the outlet of a corresponding one of the plurality of cooling fluid spray holes 1610, and the suction side 1100 or the pressure side 1200 may be greater than 0.5 times and less than 1.5 times the diameter D of the corresponding cooling fluid spray hole.

Since each of the plurality of flow guides 1620 protrudes from the flow guide part 1600 and each of the plurality of impingement holes 1630 of each flow guide 1620 is in communication with a corresponding cooling fluid spray holes 1610, the cooling fluid that is sprayed into the plurality of cooling fluid spray holes 1610 is directly sprayed onto the suction side 1100 or the pressure side 1200, whereby the heat transfer effect by the cooling fluid can be enhanced. Further, since the cooling fluid impinging on the suction side 1100 or the pressure side 1200 flows toward the plurality of heat transfer fins 1700, the heat transfer effect of the heat transfer fins 1700 by the secondary flow of the cooling fluid can be enhanced.

Referring to FIGS. 3 to 5 and FIG. 7, the first cooling flow passage 1510 includes a first inlet 1511, a 1-1 flow channel 1512, a 1-2 flow channel 1513, a 1-3 flow channel 1514, a 1-1 turning channel 1515, a 1-2 turning channel 1516, a 1-3 turning channel 1517, and a first discharge channel 1518, and the numbers of the flow channels and turning channels are exemplary and not limited thereto.

The first inlet 1511 extends downward by a predetermined length from the lower portion of the pressure side at the leading edge 1300. Specifically, the first inlet 1511 is connected to the cavity at the leading edge 1300 and extends downward. The cavity at the leading edge 1300 may substantially be the 1-1 flow channel 1512. A portion of the cooling fluid introduced through the inlet 211 formed at the root portion 210 of the airfoil 1000 can flow into the first inlet 1511.

The 1-1 flow channel 1512 is in communication with the first inlet 1511 and guides the cooling fluid introduced into the first inlet 1511 toward an airfoil tip, and the 1-1 flow channel 1512 may substantially be the cavity at the leading edge 1300 side.

The 1-1 turning channel 1515 extending toward the trailing edge 1400 is formed at the upper end of the 1-1 flow channel 1512, the 1-1 turning channel 1515 guides the cooling fluid flowing through the 1-1 flow channel 1512 to the 1-2 flow channel 1513, and the 1-2 flow channel 1513 guides the cooling fluid toward the root portion 210.

The 1-2 turning channel 1516 extending toward the trailing edge 1400 is formed at the lower end of the 1-2 flow channel 1513. The 1-2 turning channel 1516 guides the cooling fluid flowing through the 1-2 flow channel 1513 to the 1-3 flow channel 1514, and the 1-3 flow channel 1514 guides the cooling fluid toward the airfoil tip.

The 1-3 turning channel 1517 extending toward the trailing edge 1400 is formed at the upper end of the 1-3 flow channel 1514 and guides the cooling fluid flowing through the 1-3 flow channel 1514 to the first discharge channel 1518. The cooling fluid is discharged to the outside of the airfoil 1000 through the first discharge channel 1518, and a plurality of discharge holes (not shown) for discharging the cooling fluid may be formed in the first discharge channel 1518.

The 1-1 flow channel 1512 is formed at the leading edge 1300 and the channels 1513 to 1518 directly or indirectly connected to the 1-1 flow channel 1512 are formed at the pressure side 1200. The channels from 1513 to 1518 form a single serpentine flow passage, so it is possible to increase the flow time of the cooling fluid and accordingly improve cooling efficiency. The cooling fluid flowing through the first cooling flow passage 1510 can effectively cool the leading edge 1300, the pressure side 1200, and the airfoil tip at the pressure side 1200.

Referring to FIGS. 3, 4, 6, and 7, the second cooling flow passage 1520 includes a 2-1 inlet 1521, a 2-2 inlet 1522, a 2-1 flow channel 1523, a 2-3 flow channel 1524, a 2-2 flow channel 1525, a 2-4 flow channel 1526, a 2-1 turning channel 1527, a 2-2 turning channel 1528, and a second discharge channel 1529.

The 2-1 inlet 1521, the 2-1 flow channel 1523, the 2-1 turning channel 1527, and the 2-2 flow channel 1525 form a single serpentine flow passage, and the 2-2 inlet 1522, the 2-3 flow channel 1524, the 2-2 turning channel 1528, and the 2-4 flow channel 1526 form another serpentine flow passage. The numbers of the flow channels, turning channels, and serpentine channels are exemplary and are not limited thereto.

The 2-1 inlet 1521 and the 2-2 inlet 1522 may extend downward a predetermined length from the suction side 1100, the 2-1 inlet 1521 may be formed at the leading edge 1300, and the 2-2 inlet 1522 may be formed at the trailing edge 1400.

At least part of the cooling fluid introduced into the inlet 211 formed at the root portion 210 may flow into the 2-1 inlet 1521, and also at least part of the cooling fluid may flow into the 2-2 inlet 1522.

The 2-1 flow channel 1523 is in communication with the 2-1 inlet 1521 and guides the cooling fluid introduced into the 2-1 inlet 1521 toward the airfoil tip.

The 2-1 turning channel 1527 extending toward the trailing edge 1400 is formed at the upper end of the 2-1 flow channel 1527, the 2-1 turning channel 1527 guides the cooling fluid flowing through the 2-1 flow channel 1523 to the 2-2 flow channel 1525, and the 2-2 flow channel 1525 guides the cooling fluid toward the root portion 210.

The 2-3 flow channel 1524 is in communication with the 2-2 inlet 1522 and guides the cooling fluid introduced into the 2-2 inlet 1522 toward the airfoil tip.

The 2-2 turning channel 1528 extending toward the trailing edge 1300 is formed at the upper end of the 2-3 flow channel 1524, the 2-2 turning channel 1528 guides the cooling fluid flowing through the 2-3 flow channel 1524 to the 2-4 flow channel 1526, and the 2-4 flow channel 1526 guides the cooling fluid toward the root portion 210.

A communication hole CH that is in communication with the central cavity CC is formed on a side of the lower end of each of the 2-2 flow channel 1525 and the 2-4 flow channel 1526, and the communication holes CH may be formed on the side at the central cavity CC, but the communication holes CH are not limited to being formed on the side.

The central cavity CC is a flow space formed in the area defined by the 1-1 flow channel 1512 that is the cavity at the leading edge 1300, the 1-2 flow channel 1513 and the 1-3 flow channel 1514 that are the cavities at the suction side 1100, and the 2-1 flow channel 1523, the 2-2 flow channel 1525, the 2-4 flow channel 1526, and the 2-3 flow channel 1524 that are the cavities at the pressure side 1200. The cooling fluid flowing through the 2-2 flow channel 1525 and the 2-4 flow channel 1526 merges inside the central cavity CC through the communication holes CH.

The second discharge channel 1529 extends substantially at the same height as the central cavity CC and is formed to be in communication with a connecting hole (not shown) formed on a side at the trailing edge 1400 of the central cavity CC. A plurality of discharge holes 1529*a* for discharging cooling fluid may be formed in a matrix pattern in a predetermined area at the trailing edge 1400 of the second discharge channel 1529.

The 2-1 flow channel 1523, the 2-2 flow channel 1525, the 2-3 flow channel 1524, and the 2-4 flow channel 1526 form at least two or more serpentine flow passages at the suction side 1100, whereby it is possible to increase the flow time of the cooling fluid and improve cooling efficiency. The cooling fluid flowing through the second cooling flow passage 1520 can effectively cool the trailing edge 1400, the suction side 1100, and the airfoil tip at the suction side 1100.

Accordingly, it is possible to cool the suction side 1100 or the pressure side 1200 using cooling fluid, so it is possible to improve the cooling performance for the airfoil 1000, and thus it is possible to reduce the amount of cooling fluid that is used.

Further, since it is possible to improve the cooling performance for the airfoil 1000, it is possible to improve the engine performance of the gas turbine 1.

Although the present disclosure has been described with reference to the exemplary embodiments illustrated in the drawings, those are only examples and may be changed and modified into other equivalent exemplary embodiments from the present disclosure by those skilled in the art. Therefore, the technical protective range of the present disclosure should be determined by the scope described in claims.

What is claimed is:

1. An airfoil comprising:

a suction side having an outwardly convex surface;

a pressure side having a concave surface toward the suction side;

a leading edge connecting the suction side and the pressure side and defining a front end of the airfoil;

a trailing edge connecting the suction side and the pressure side and defining a rear end of the airfoil;

a cooling flow passage configured to guide cooling fluid, introduced from a lower portion of the suction side and the pressure side, to one or more flow channels respectively at the suction side and the pressure side, and to discharge the cooling fluid to a region rearward of the trailing edge;

a flow guide part provided in each of the one or more flow channels and forming a cooling space; and a plurality of cooling fluid spray holes formed in the flow guide part and configured to spray the cooling fluid supplied into the one or more flow channels to the suction side and the pressure side, each forming an inner surface of the cooling space, wherein a plurality of flow guides protruding toward the cooling space are provided on one surface of the flow guide part, a plurality of impingement holes, each in communication with a corresponding one of the plurality of cooling fluid spray boles, are formed respectively in the plurality of flow guides, a circumferential surface of each of the plurality of flow guides has a circular shape, and each of the plurality of cooling fluid spray holes is disposed at a center of a corresponding flow guide of the plurality of flow guides, and each of the plurality of flow guides protrudes obliquely from its circumferential surface toward a center where a corresponding impingement hole is formed.

2. The airfoil of claim 1, further comprising a plurality of heat transfer fins provided on the one surface of the flow guide part and connecting the flow guide part to the suction side or to the pressure side.

3. The airfoil of claim 2, wherein the plurality of heat transfer fins are arranged on the one surface of the flow guide part so as to be positioned at top, bottom, left, and right locations around each cooling fluid spray hole, outer circumferential surfaces of the plurality of heat transfer fins are disposed on the circumferential surface of each of the plurality of flow guides, and a distance between an outlet of each cooling fluid spray hole and the suction side or the pressure side is greater than 0.5 times and less than 1.5 times a diameter of a corresponding one of the plurality of cooling fluid spray holes.

4. The airfoil of claim 1, wherein the cooling flow passage comprises:

a first cooling flow passage configured to guide the cooling fluid, introduced from the lower portion of the pressure side at the leading edge, to the one or more flow channels formed at the pressure side, and then discharge the cooling fluid toward the region rearward of the trailing edge; and a second cooling flow passage configured to divide the cooling fluid introduced from the lower portion of the suction side to the one or more flow channels formed at the suction side, merge the divided cooling fluid, and then discharge the cooling fluid toward the region rearward of the trailing edge.

5. The airfoil of claim 4, wherein the first cooling flow passage comprises:

a first inlet extending downward from the lower portion of the pressure side at the leading edge and configured to receive the cooling fluid;

a 1-1 flow channel configured to guide the cooling fluid introduced into the first inlet toward an airfoil tip;

a 1-2 flow channel formed adjacent to the 1-1 flow channel and configured to guide the cooling fluid toward a root portion of the airfoil;

a 1-3 flow channel formed adjacent to the 1-2 flow channel and configured to guide the cooling fluid toward the airfoil tip;

a 1-1 turning channel extending toward the trailing edge from an upper end of the 1-1 flow channel;

a 1-2 turning channel extending toward the trailing edge from a lower end of the 1-2 flow channel;

a 1-3 turning channel extending toward the trailing edge from an upper end of the 1-3 flow channel; and a first discharge channel configured to discharge the cooling fluid flowing through the 1-3 flow channel to an outside of the airfoil, and the second cooling flow passage comprises:

a 2-1 inlet and a 2-2 inlet extending downward from the lower portion of the suction side and configured to receive the cooling fluid;

a 2-1 flow channel and a 2-3 flow channel configured to respectively guide the cooling fluid introduced into the 2-1 inlet and the 2-2 inlet toward the airfoil tip;

a 2-2 flow channel and a 2-4 flow channel formed adjacent to the 2-1 flow channel and the 2-3 flow channel, respectively, and configured to guide the cooling fluid toward the root portion of the airfoil;

a 2-1 turning channel extending toward the trailing edge from an upper end of the 2-1 flow channel; and a 2-2 turning channel extending toward the leading edge from an upper end of the 2-3 flow channel.

6. The airfoil of claim 5, wherein a communication hole that is in communication with a central cavity is formed at a lower end of each of the 2-2 flow channel and the 2-4 flow channel, the central cavity being formed in an area defined by a cavity at the leading edge, cavities at the pressure side, and cavities at the suction side, the cooling fluid flowing through the 2-2 flow channel and the 2-4 flow channel merges within the central cavity through the communication holes, the second cooling flow passage further comprises a second discharge channel configured to discharge the cooling fluid in the central cavity to the outside of the airfoil, and a connecting hole that is in communication with the second discharge channel is formed on a side at the trailing edge of the central cavity.

7. A turbine blade mounted on a turbine rotor disk and rotated by high-pressure combustion gas, the turbine blade comprising:

a root portion coupled to the turbine rotor disk; and an airfoil coupled to the root portion, and having a cooling flow passage comprising a first cooling flow passage and a second cooling flow passage formed in the airfoil, wherein the airfoil comprises:

a suction side having an outwardly convex surface;

a pressure side having a concave surface toward the suction side;

a leading edge connecting the suction side and the pressure side and defining a front end of the airfoil;

a trailing edge connecting the suction side and the pressure side and defining a rear end of the airfoil;

the cooling flow passage configured to guide cooling fluid introduced from a lower portion of the suction side and the pressure side, to one or more flow channels respectively at the suction side and the pressure side, and then discharge the cooling fluid to a region rearward of the trailing edge;

a flow guide part provided in each of the one or more flow channels and forming a cooling space; and a plurality of cooling fluid spray holes formed in the flow guide part and configured to spray the cooling fluid supplied into the one or more flow channels to the suction side and the pressure side, each forming an inner surface of the cooling space, wherein a plurality of flow guides protruding toward the cooling space are provided on one surface of the flow guide part, a plurality of impingement holes, each in communication with a corresponding one of the plurality of cooling fluid spray holes, are formed respectively in the plurality of flow guides, a circumferential surface of each of the plurality of flow guides has a circular shape, and each of the plurality of cooling fluid spray holes is disposed at a center of a corresponding flow guide of the plurality of flow guides, and each of the plurality of flow guides protrudes obliquely from its circumferential surface toward a center where a corresponding impingement hole is formed.

8. The turbine blade of claim 7, further comprising a plurality of heat transfer fins provided on the one surface of the flow guide part and connecting the flow guide part to the suction side or to the pressure side.

9. The turbine blade of claim 8, wherein the plurality of heat transfer fins are arranged on the one surface of the flow guide part so as to be positioned at top, bottom, left, and right locations around each cooling fluid spray hole, outer circumferential surfaces of the plurality of heat transfer fins are disposed on the circumferential surface of each of the plurality of flow guides, and a distance between an outlet of each cooling fluid spray hole and the suction side or the pressure side is greater than 0.5 times and less than 1.5 times a diameter of a corresponding one of the plurality of cooling fluid spray holes.

10. The turbine blade of claim 7, wherein the cooling flow passage comprises:

the first cooling flow passage configured to guide the cooling fluid, introduced from the lower portion of the pressure side at the leading edge, to the one or more flow channels formed at the pressure side, and then discharge the cooling fluid toward the region rearward of the trailing edge; and the second cooling flow passage configured to divide the cooling fluid introduced from the lower portion of the suction side to the one or more flow channels formed at the suction side, merge the divided cooling fluid, and then discharge the cooling fluid toward the region rearward of the trailing edge.

11. The turbine blade of claim 10, wherein the first cooling flow passage comprises:

a first inlet extending downward from the lower portion of the pressure side at the leading edge and configured to receive the cooling fluid;

a 1-1 flow channel configured to guide the cooling fluid introduced into the first inlet toward an airfoil tip;

a 1-2 flow channel formed adjacent to the 1-1 flow channel and configured to guide the cooling fluid toward the root portion of the airfoil;

a 1-3 flow channel formed adjacent to the 1-2 flow channel and configured to guide the cooling fluid toward the airfoil tip;

a 1-1 turning channel extending toward the trailing edge from an upper end of the 1-1 flow channel; and a 1-2 turning channel extending toward the trailing edge from a lower end of the 1-2 flow channel;

a 1-3 turning channel extending toward the trailing edge from an upper end of the 1-3 flow channel; and a first discharge channel configured to discharge the cooling fluid flowing through the 1-3 flow channel to an outside of the airfoil, and the second cooling flow passage comprises:

a 2-1 inlet and a 2-2 inlet extending downward from the lower portion of the suction side and configured to receive the cooling fluid;

a 2-1 flow channel and a 2-3 flow channel configured to respectively guide the cooling fluid introduced into the 2-1 inlet and the 2-2 inlet toward the airfoil tip;

a 2-2 flow channel and a 2-4 flow channel formed adjacent to the 2-1 flow channel and the 2-3 flow channel, respectively, and configured to guide the cooling fluid toward the root portion of the airfoil;

a 2-1 turning channel extending toward the trailing edge from an upper end of the 2-1 flow channel; and a 2-2 turning channel extending toward the leading edge from an upper end of the 2-3 flow channel.

12. The turbine blade of claim 11, wherein a communication hole that is in communication with a central cavity is formed at a lower end of each of the 2-2 flow channel and the 2-4 flow channel, the central cavity being formed in an area defined by a cavity at the leading edge, cavities at the pressure side, and cavities at the suction side, the cooling fluid flowing through the 2-2 flow channel and the 2-4 flow channel merges within the central cavity through the communication holes, the second cooling flow passage further comprises a second discharge channel configured to discharge the cooling fluid in the central cavity to the outside of the airfoil, and a connecting hole that is in communication with the second discharge channel is formed on a side at the trailing edge of the central cavity.

13. A gas turbine comprising:

a compressor configured to compress intake air;

a combustor configured to mix compressed air from the compressor with fuel and burn the mixture; and a turbine configured to generate power using combustion gas from the combustor, and comprising turbine vanes configured to guide the combustion gas on a combustion gas path along which the combustion gas flows and turbine blades that are rotated by the combustion gas on the combustion gas path, wherein the turbine blade comprises an airfoil having a cooling flow passage comprising a first cooling flow passage and a second cooling flow passage formed in the airfoil, wherein the airfoil comprises:

a suction side having an outwardly convex surface;

a pressure side having a concave surface toward the suction side;

a leading edge connecting the suction side and the pressure side and defining a front end of the airfoil;

a trailing edge connecting the suction side and the pressure side and defining a rear end of the airfoil;

the cooling flow passage configured to guide cooling fluid introduced from a lower portion of the suction side and the pressure side, to one or more flow channels respectively at the suction side and the pressure side, and to discharge the cooling fluid to a region rearward of the trailing edge;

a flow guide part provided in each of the one or more flow channels and forming a cooling space; and a plurality of cooling fluid spray holes formed in the flow guide part and configured to spray the cooling fluid supplied into the one or more flow channels to the suction side and the pressure side, each forming an inner surface of the cooling space, wherein a plurality of flow guides protruding toward the cooling space are pr vided on one surface of the flow guide part, a plurality of impingement holes, each in communication with a corresponding one of the plurality of cooling fluid spray boles, are formed respectively in the plurality of flow guides, a circumferential surface of each of the plurality of flow guides has a circular shape, and each of the plurality of cooling fluid spray holes is disposed at a center of a corresponding flow guide of the plurality of flow guides, and each of the plurality of flow guides protrudes obliquely from its circumferential surface toward a center where a corresponding impingement hole is formed.

14. The gas turbine of claim 13, further comprising a plurality of heat transfer fins provided on the one surface of the flow guide part and connecting the flow guide part to the suction side or to the pressure side, wherein the plurality of heat transfer fins are arranged on the one surface of the flow guide part so as to be positioned at top, bottom, left, and right locations around each cooling fluid spray hole, outer circumferential surfaces of the plurality of heat transfer fins are disposed on the circumferential surface of each of the plurality of flow guides, and a distance between an outlet of each cooling fluid spray hole and the suction side or the pressure side is greater than 0.5 times and less than 1.5 times a diameter of a corresponding one of the plurality of cooling fluid spray holes.

15. The gas turbine of claim 13, wherein the cooling flow passage comprises:

a first cooling flow passage configured to guide the cooling fluid, introduced from the lower portion of the pressure side at the leading edge, to the one or more flow channels formed at the pressure side, and then discharge the cooling fluid toward the region rearward of the trailing edge; and a second cooling flow passage configured to divide the cooling fluid introduced from the lower portion of the suction side to the one or more flow channels formed at the suction side, merge the divided cooling fluid, and then discharge the cooling fluid toward the region rearward of the trailing edge.

16. The gas turbine of claim 15, wherein the first cooling flow passage comprises:

a first inlet extending downward from the lower portion of the pressure side at the leading edge and configured to receive the cooling fluid;

a 1-1 flow channel configured to guide the cooling fluid introduced into the first inlet toward an airfoil tip;

a 1-2 flow channel formed adjacent to the 1-1 flow channel and configured to guide the cooling fluid toward the root portion of the airfoil;

a 1-3 flow channel formed adjacent to the 1-2 flow channel and configured to guide the cooling fluid toward the airfoil tip;

a 1-1 turning channel extending toward the trailing edge from an upper end of the 1-1 flow channel; and a 1-2 turning channel extending toward the trailing edge from a lower end of the 1-2 flow channel;

a 1-3 turning channel extending toward the trailing edge from an upper end of the 1-3 flow channel; and a first discharge channel configured to discharge the cooling fluid flowing through the 1-3 flow channel to an outside of the airfoil, and the second cooling flow passage comprises:

a 2-1 inlet and a 2-2 inlet extending downward from the lower portion of the suction side and configured to receive the cooling fluid;

a 2-1 flow channel and a 2-3 flow channel configured to respectively guide the cooling fluid introduced into the 2-1 inlet and the 2-2 inlet toward the airfoil tip;

a 2-2 flow channel and a 2-4 flow channel formed adjacent to the 2-1 flow channel and the 2-3 flow channel, respectively, and configured to guide the cooling fluid toward the root portion of the airfoil;

a 2-1 turning channel extending toward the trailing edge from an upper end of the 2-1 flow channel; and a 2-2 turning channel extending toward the leading edge from an upper end of the 2-3 flow channel.

17. The gas turbine of claim 16, wherein a communication hole that is in communication with a central cavity is formed at a lower end of each of the 2-2 flow channel and the 2-4 flow channel, the central cavity being formed in an area defined by a cavity at the leading edge, cavities at the pressure side, and cavities at the suction side, the cooling fluid flowing through the 2-2 flow channel and the 2-4 flow channel merges within the central cavity through the communication holes, the second cooling flow passage further comprises a second discharge channel configured to discharge the cooling fluid in the central cavity to the outside of the airfoil, and a connecting hole that is in communication with the second discharge channel is formed on a side at the trailing edge of the central cavity.

* * * * *